(12) United States Patent
Katano

(10) Patent No.: US 8,293,420 B2
(45) Date of Patent: Oct. 23, 2012

(54) FUEL CELL VEHICLE

(75) Inventor: Koji Katano, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/321,961

(22) PCT Filed: Apr. 12, 2010

(86) PCT No.: PCT/IB2010/000799
§ 371 (c)(1),
(2), (4) Date: Nov. 22, 2011

(87) PCT Pub. No.: WO2010/136857
PCT Pub. Date: Dec. 2, 2010

(65) Prior Publication Data
US 2012/0070757 A1    Mar. 22, 2012

(30) Foreign Application Priority Data

May 25, 2009  (JP) .................. 2009-125379

(51) Int. Cl.
*H01M 8/04* (2006.01)
(52) U.S. Cl. .................. 429/446; 429/444
(58) Field of Classification Search .......... None
See application file for complete search history.

(56) References Cited

U.S. PATENT DOCUMENTS

| | | | |
|---|---|---|---|
| 5,939,218 A * | 8/1999 | Mizuno | 429/432 |
| 7,943,264 B2 * | 5/2011 | Yumita et al. | 429/443 |
| 2001/0028970 A1 * | 10/2001 | Sano et al. | 429/22 |
| 2003/0082433 A1 * | 5/2003 | Sano et al. | 429/39 |
| 2009/0101423 A1 | 4/2009 | Jufuku | |

FOREIGN PATENT DOCUMENTS

| | | |
|---|---|---|
| JP | 2008-103276 A | 5/2008 |
| JP | 2008-108668 A | 5/2008 |
| JP | 2008-112679 A | 5/2008 |

OTHER PUBLICATIONS

International Search Report mailed Jul. 23, 2010 of PCT/IB2010/000799 & Written Opinion.

* cited by examiner

*Primary Examiner* — John S Maples
(74) *Attorney, Agent, or Firm* — Kenyon & Kenyon LLP

(57) ABSTRACT

The pressure-adjusting valve provided in the cathode outlet of a fuel cell stack constituting a fuel cell system has a function of adjusting the oxidizing gas pressure in the fuel cell stack according to the adjustment of the valve opening degree. When the exhaust pipe is flooded with water, the pressure inside the exhaust pipe varies from the atmospheric pressure and the opening degree of the pressure-adjusting valve changes. The flooding estimation signal output processing unit of the control unit outputs a flooding estimation signal indicating that the exhaust pipe is flooded when an opening degree difference that is a difference between the opening degree of the pressure-adjusting valve and a preset opening degree corresponding to the operation directed pressure is equal to or greater than a preset threshold opening degree difference. The processing of inhibiting the flowing is performed based on this signal.

12 Claims, 3 Drawing Sheets

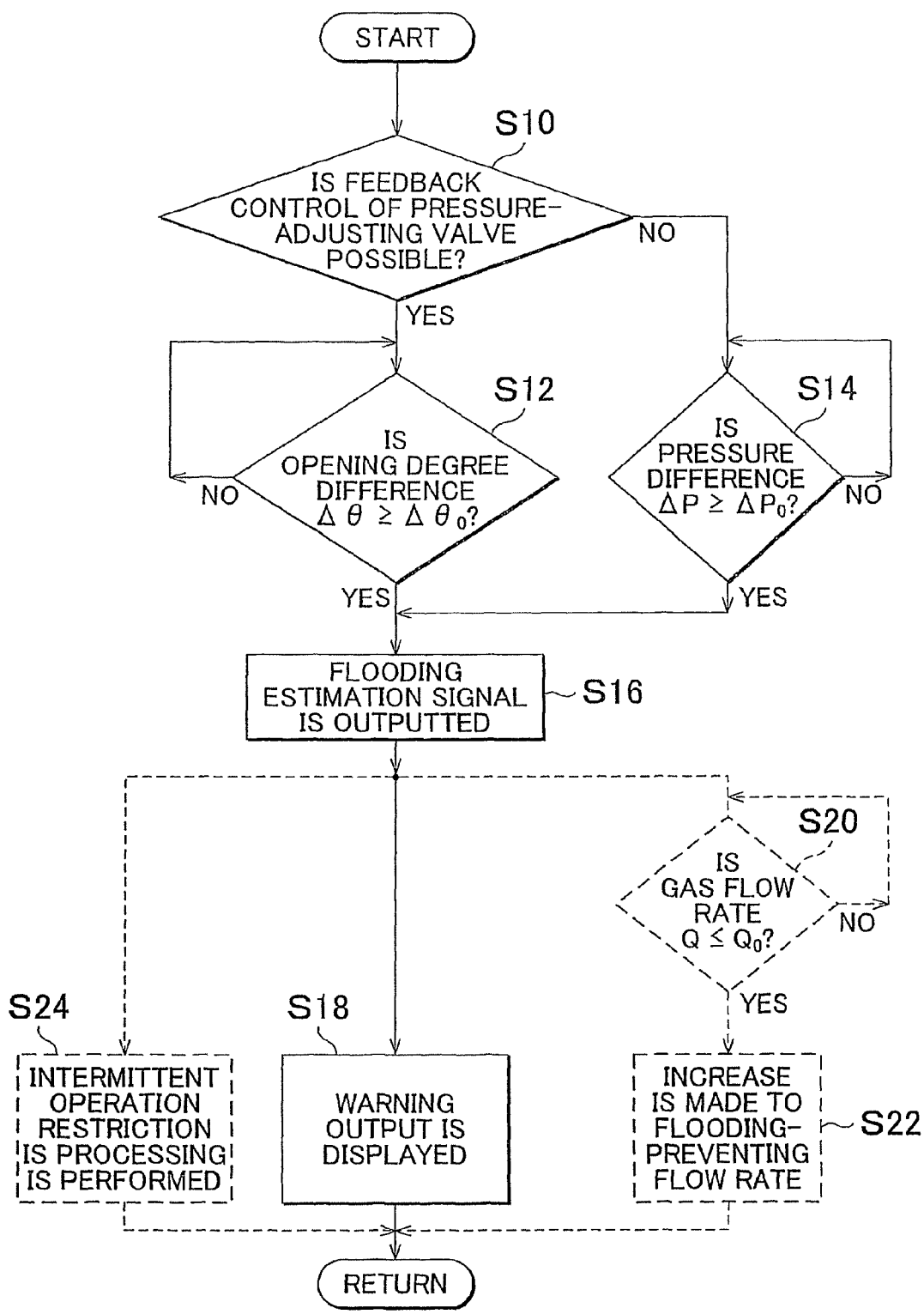

FUEL CELL VEHICLE

This is a 371 national phase application of PCT/IB2010/000799 filed 12 Apr. 2010, claiming priority to Japanese Patent Application No. 2009-125379 filed 25 May 2009, the contents of which are incorporated herein by reference.

BACKGROUND OF THE INVENTION

1. Field of the Invention

The invention relates to a fuel cell vehicle, and more particularly to a fuel cell vehicle provided with an exhaust pipe that releases exhaust gas from a fuel cell system to the outside.

2. Description of the Related Art

Fuel cells have been installed in vehicles because fuel cells produce little effect on environment. In a fuel cell, for example, a fuel gas such as hydrogen is supplied to an anode side of a fuel cell stack, a gas including oxygen, for example air, is supplied as an oxidizing gas to a cathode side of the fuel cell stack, and the electric power is generated by a reaction via an electrolyte membrane as required.

As described above, a reaction of fuel gas and oxidizing gas proceeds in the fuel cell. Therefore, the spent fuel gas and spent oxidizing gas in the reaction are released via an exhaust pipe to the outside as an exhaust gas together with water as a reaction product. In a vehicle, the exhaust pipe is configured to have rearward opening below the vehicle body similarly to the exhaust pipe of a conventional gasoline engine.

Accordingly, where the vehicle travels under the rain or snow, or through deep snow or water pools, water can flood the exhaust pipe, thereby preventing the release of the exhaust gas to the outside. In some cases, water penetrating from the outside can flow back together with the exhaust gas inside the exhaust pipe to the fuel cell. Therefore, backflow in the exhaust pipe has to be prevented.

For example, Japanese Patent Application Publication No. 2008-103276 (JP-A-2008-103276) describes a configuration including an exhaust pipe having a first exhaust channel in which a spent fuel gas released from the fuel cell and a cathode off-gas after the power generation reaction flow separately from each other and a second exhaust channel that is connected to the first exhaust channel and has an exhaust port in the direction perpendicular to the exhaust channel. This configuration does not relate to the penetration of water from the outside, but serves to prevent the backflow in the exhaust pipe. In this configuration, a baffle plate member is provided inside the exhaust pipe to prevent wind from directly entering the inside of the exhaust pipe from the exhaust port.

Japanese Patent Application Publication No. 2008-112679 (JP-A-2008-112679) discloses a configuration in which water vapors contained in a cathode off-gas released from a fuel cell are cooled while flowing in an exhaust pipe of a fuel cell vehicle and partially condensed, but the when the vehicle travels at a constant speed or accelerated, the condensed water is caused to flow from the front to the rear side of the vehicle in the exhaust pipe by the flow of the exhaust gas and an inertia force.

However, it is indicated that where the vehicle is decelerated, the condensed water flows backward and enter the inside of the fuel cell from the exhaust port of the fuel cell. Accordingly, in the JP-A-2008-112679, a step structure is described that includes a first pipe section that is closed at one end, opened as an exhaust port at the other end, and provided with an opening at a predetermined distance from the closed end, and a second pipe section that is connected at one end to the opening and connected at the other end to the fuel cell stack. Further, it is mentioned that because condensed water is stopped by the closed end of the first pipe section, the backflow is prevented.

By providing the baffle plate as described in JP-A-2008-103276, it is possible to prevent to a certain degree the backflow of gas from the outside, and by providing the step structure as in JP-A-2008-112679, it is possible to prevent to a certain degree the backflow of condensed water located inside the exhaust pipe. However, because a fuel cell system generates water as a reaction product, as described hereinabove, the exhaust pipe also has a function of draining water that is the reaction product. In such a case, providing the exhaust pipe with the structures such as described in JP-A-2008-103276 and JP-A-2008-112679 will degrade the draining performance.

SUMMARY OF THE INVENTION

The invention provides a fuel cell vehicle that inhibits the flooding with water from the outside, while ensuring the draining of water that is the reaction product, in an exhaust pipe that releases the exhaust gas of the fuel cell and also to provide a method for controlling such a fuel cell vehicle.

The first aspect of the invention relates to a fuel cell vehicle. The fuel cell vehicle includes: a fuel cell stack that generates power by using an oxidizing gas and a fuel gas; an exhaust pipe that releases the oxidizing gas and fuel gas from the fuel cell stack to the outside; a pressure-adjusting valve that is provided between a cathode outlet of the fuel cell stack and the exhaust pipe and adjusts an oxidizing gas pressure inside the fuel cell stack correspondingly to adjustment of an opening degree; a pressure-adjusting valve opening degree control unit that performs feedback control of an opening degree of the pressure-adjusting valve so as to maintain the oxidizing gas pressure inside the fuel cell stack at an operation directed pressure that is directed to the fuel cell stack; and a flood estimation signal output unit that outputs a flooding estimation signal indicating that the exhaust pipe is flooded when an opening degree difference that is a difference between the opening degree of the pressure-adjusting valve and a preset opening degree corresponding to the operation directed pressure is equal to or greater than a preset threshold opening degree difference.

With such a configuration; when feedback control of the opening degree of the pressure-adjusting valve is performed so as to maintain the oxidizing gas pressure inside the fuel cell stack at an operation directed pressure that is directed to the fuel cell stack, a flooding estimation signal is outputted that indicates that the exhaust pipe is flooded when an opening degree difference that is a difference between the opening degree of the pressure-adjusting valve and a preset opening degree corresponding to the operation directed pressure is equal to or greater than a preset threshold opening degree difference. Thus, because the possibility of the exhaust pipe being flooded is established without requiring a special sensor, adequate processing can be performed before the water reaches the fuel cell stack. Moreover, since flooding is prevented not by means of any special baffle board or stepped structure, abilities of discharging water as a reaction product in a fuel cell stack are not hampered.

The above-described configuration may further include a display device that displays a warning output that demands that the vehicle be moved on the basis of the flooding estimation signal.

With such a configuration, a warning output that demands that the vehicle be moved is displayed on the basis of the flooding estimation signal. If the driver sees the warning output display, the driver moves the vehicle, thereby imparting a certain speed to the vehicle. If the vehicle speed is higher than the flooding speed in the exhaust pipe, the exhaust pipe is prevented from flooding.

The above-described configuration may further include a flow rate modification unit that increases an oxidizing gas flow rate to a preset flooding-preventing flow rate when the oxidizing gas flow rate in the exhaust pipe is equal to or lower than a preset threshold flow rate in a state in which the flooding estimation signal has been outputted.

With such a configuration, an oxidizing gas flow rate is increased to a preset flooding-preventing flow rate when the oxidizing gas flow rate in the exhaust pipe is equal to or lower than a preset threshold flow rate in a state in which the flooding estimation signal has been outputted. If the oxidizing gas flow rate in the exhaust pipe increases, water that is assumed to flood the exhaust pipe is pushed back to the outside, thereby preventing the exhaust pipe from flooding.

The above-described configuration may further include an intermittent operation restriction unit that performs a control that inhibits an intermittent operation of the fuel cell on the basis of the flooding estimation signal.

With such a configuration, the control that inhibits an intermittent operation of the fuel cell is performed on the basis of the flooding estimation signal. When the fuel cell is operated intermittently, the exhaust gas flow also becomes discontinuous. Therefore, flooding can easily occur. For example, a condition that the temperature of a coolant is abnormal is a condition for prohibiting the intermittent operation of the fuel cell. The probability of flooding can be reduced by adding the output of the flooding estimation signal to this prohibition condition.

The above-described configuration may further include a pressure detection unit that detects an oxidizing gas pressure inside the fuel cell stack, wherein the flooding estimation signal output unit outputs the flooding estimation signal on the basis of a detected pressure of the pressure detection unit, if the feedback control of the opening degree of the pressure-adjusting valve is impossible.

With such a configuration, a pressure detection unit is provided that detects an oxidizing gas pressure, inside the fuel cell stack. Further, the flooding estimation signal is outputted on the basis of a detected pressure of the pressure detection unit, if the feedback control of the opening degree of the pressure-adjusting valve is impossible. The feedback control of the opening degree of the pressure-adjusting valve is impossible, for example, where the feedback is prohibited when the opening-closing noise of the valve caused by the feedback becomes a problem and when the pressure-adjusting valve fails. In such cases, a flooding estimation signal indicating that the exhaust pipe is flooded is outputted when a difference between the detected pressure of the pressure detection unit and the operation directed pressure is equal to or greater than a preset threshold pressure difference.

The invention also relates to a control method for a fuel cell vehicle provided with a fuel cell stack that generates power by using an oxidizing gas and a fuel gas; an exhaust pipe that releases the oxidizing gas and fuel gas from the fuel cell stack to the outside; and a pressure-adjusting valve that is provided between a cathode outlet of the fuel cell stack and the exhaust pipe and adjusts an oxidizing gas pressure inside the fuel cell stack correspondingly to adjustment of an opening degree. The control method includes: performing feedback control of an opening degree of the pressure-adjusting valve so as to maintain the oxidizing gas pressure inside the fuel cell stack at an operation directed pressure that is directed to the fuel cell stack; and outputting a flooding estimation signal indicating that the exhaust pipe is flooded when an opening degree difference that is a difference between the opening degree of the pressure-adjusting valve and a preset opening degree corresponding to the operation directed pressure is equal to or greater than a preset threshold opening degree difference.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3 is a flowchart illustrating the sequence of inhibiting the flooding of the exhaust pipe in the embodiment of the invention.

DETAILED DESCRIPTION OF EMBODIMENTS

Figure 1:
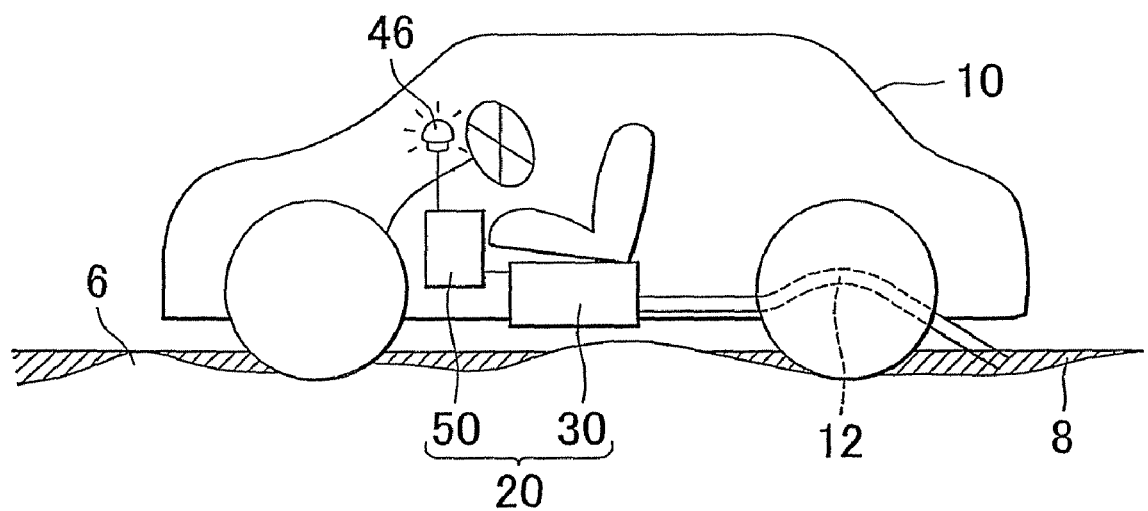
FIG. 1 illustrates an exhaust pipe in a fuel cell vehicle of an embodiment of the invention.

An embodiment of the invention will be described below with reference to the appended drawings. In the fuel cell system explained below, a hydrogen source and an exhaust valve are disposed at the anode side, an oxidizing gas source, a pressure sensor, and a pressure-adjusting valve are disposed at the cathode side, and a diluting unit is provided that collects the spent gases of the aforementioned components and dilutes the collected spent fuel gas, but this set of components is merely minimum necessary for the explanation. For example, a regulator, a hydrogen pump, and a gas-liquid separator may be provided at the anode side, a filter, an air compressor, an inlet cut-off valve, an outlet cut-off valve, and various bypass valves may be provided at the cathode side, and a coolant system may be also provided.

In all the drawings, like components are denoted by the same reference numerals and redundant explanation thereof will be omitted. In the text of description, the reference numerals that have been heretofore mentioned will be used as necessary.

FIG. 1 illustrates the entire configuration of a fuel cell vehicle 10. This configuration relates to a state in which the fuel cell vehicle 10 traveling on a road 6 has arrived to a site where there is a water pool 8, an exhaust pipe 12 is dipped into the water pool 8, and water floods the exhaust pipe 12.

A fuel cell system 20 is disposed under the floor of the fuel cell vehicle 10. A fuel cell main unit 30, a fuel cell control unit 50, and a display unit 46 are shown in FIG. 1 as representative constituent components of the fuel cell system 20.

The fuel cell main unit 30 includes a fuel cell stack that generates electric power by an electrochemical reaction of hydrogen serving as a fuel gas and air as an oxidizing gas. The fuel cell control unit 50 has a function of controlling the operation of the fuel cell main unit 30 and also has a control function of inhibiting the flooding of exhaust pipe 12 with water. The display unit 46 has a function of displaying a warning output that demands that the vehicle be moved when a water flooding estimation signal is outputted as an indication that water can flood the exhaust pipe 12 by the function of the fuel cell control unit 50, as will be described hereinbelow. In the example illustrated by FIG. 1, a state is shown in which the water flooding estimation signal is outputted and the display unit 46 is lit up as an indication thereof.

As shown in FIG. 1, the fuel cell main unit 30 is disposed under the floor of the vehicle 10. The fuel cell main unit 30 can be disposed not only under the floor of the vehicle 10, but also, for example, in place of the engine in the engine compartment serving to dispose the engine. In this case, although the engine is replaced With the fuel cell system as a drive source of the vehicle, the volume of the engine compartment obviously cannot be reduced. In this regard, disposing the fuel cell main unit 30 under the floor of the vehicle 10 makes it possible to reduce substantially the volume of the engine compartment.

Where the fuel cell main unit 30 is disposed under the floor of the vehicle 10, there is no significant difference in height in the gravity force direction between the exhaust pipe 12 and the fuel cell main unit 30 and the possibility of water penetrating from the exhaust pipe 12 increases. The exhaust pipe 12 apparently may be configured to ensure the difference in height in the gravity force direction, but such a configuration reduces the release of water that is the reaction product of the fuel cell. This is one of the problems that have to be resolved by the invention.

The exhaust pipe 12 has a function of releasing the fuel gas and oxidizing gas that have been spent in the electrochemical reaction in the fuel cell main unit 30 to the outside, and the exhaust pipe 12 serves as a pipe section extending rearward of the fuel cell vehicle 10 from the fuel cell main unit 30. In order to inhibit the flooding with water, the exhaust pipe 12 is configured to provide a difference in height in the gravity force direction. Thus, the pipe is bent upward to a position somewhat higher than the section connected to the fuel cell main unit 30 and then again lowered to a position below the floor of the vehicle. The exhaust opening is thus located at the end of the lowered section.

Such a difference in height of the exhaust pipe 12 in the gravity force direction is sometimes called "kick-up". Where the kick-up height is too larger, the volume of the passenger cabin above the floor of the vehicle 10 is undesirably reduced. When the kick-up is absent, water floods the exhaust pipe 12 and water reaches the fuel cell main unit 30, the fuel cell stack may be damaged. The kick-up is thus set to a certain height with consideration for the above-described facts, but in some cases the kick-up is insufficient to prevent the exhaust pipe 12 from flooding.

Figure 2:
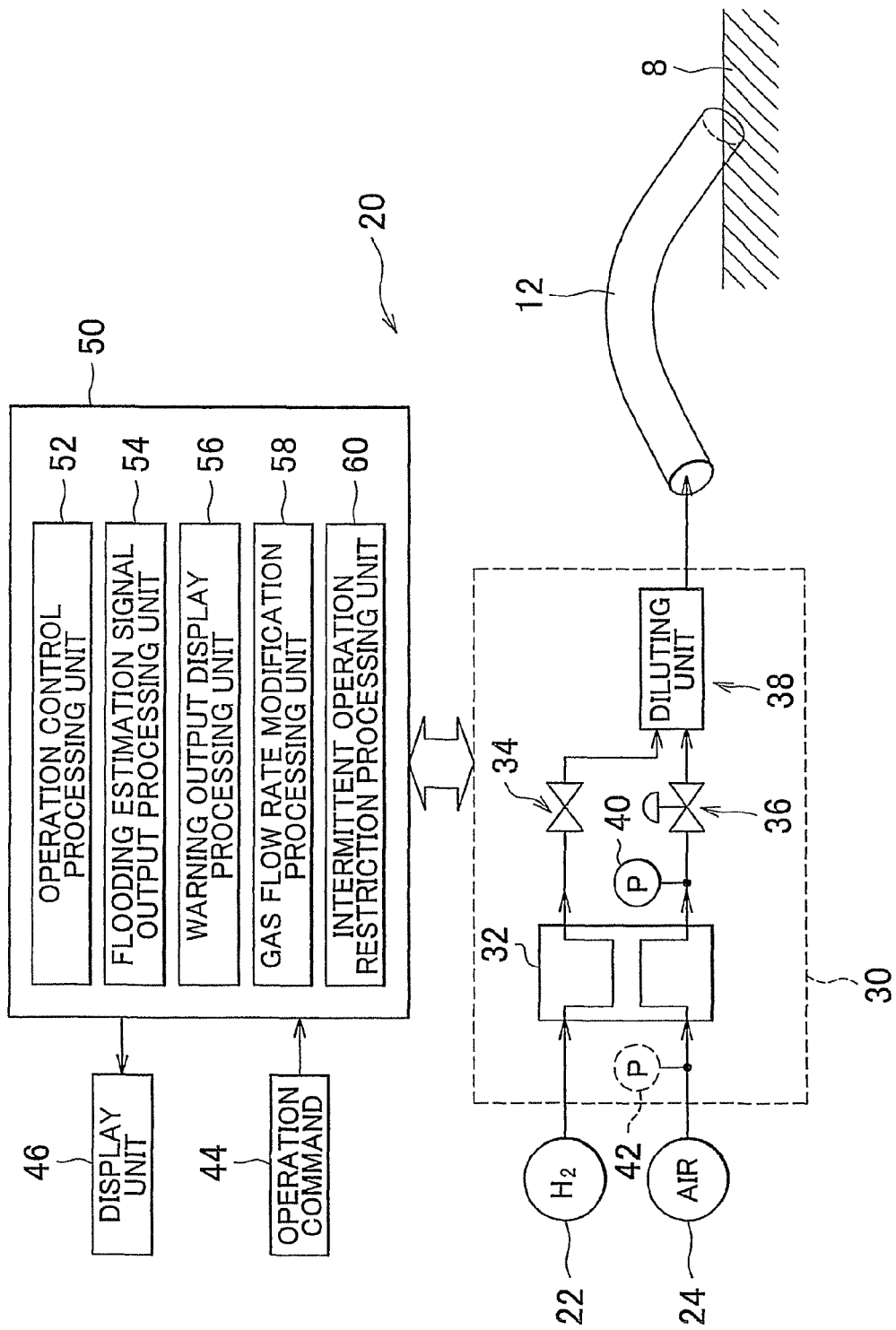
FIG. 2 illustrates the configuration of a fuel cell system of the embodiment of the invention.

FIG. 2 illustrates the configuration of the fuel cell system 20. As described above, the fuel cell system 20 includes the fuel cell main unit 30 and the control unit 50 that controls the entire operation of each constituent component of the fuel cell main unit 30 on the basis of an operation command 44 from a vehicle operation command unit (not shown in the figure).

The fuel cell main emit 30 includes a fuel cell stack 32 in which a plurality of unit fuel cells are stacked, components for hydrogen gas supply that are disposed on the anode side of the fuel cell stack 32, and components for air supply that are disposed on the cathode side.

The fuel cell stack 32 is a battery constituted by connecting a plurality of unit fuel cells that are called unit cells so as to take out the desired terminal voltage and output current. The unit cell has a structure in which a catalyst layer, a diffusion layer, a porous electrode layer, and a separator are disposed on the cathode side and anode side so as to sandwich an electrolyte membrane therebetween. In the unit cell, a fuel gas such as hydrogen is supplied to the anode side, an oxidizing gas containing oxygen, for example air, is supplied to the cathode side, and thus power is generated by an electrochemical reaction via the electrolyte membrane. In this manner, the unit cell has a function of generating necessary power.

A hydrogen gas source 22 on the anode side is a tank that supplies hydrogen as a fuel gas. The fuel gas from the hydrogen gas source 22 is supplied to the anode inlet of the fuel cell stack 32 and a spent fuel gas is released from the outlet. An exhaust valve 34 provided in the anode outlet of the fuel cell stack 32 is an opening-closing valve that has a function of opening under the predetermined conditions and releasing the spent fuel gas into a diluting unit 38.

An oxygen supply source (AIR) 24 on the cathode side is an oxidizing gas source, but actually air can be used therein. The oxidizing gas from the oxygen supply source 24 is supplied to the cathode inlet of the fuel cell stack 32 and the spent oxidizing gas is released from the outlet.

A pressure-adjusting valve 36 provided immediately downstream of the cathode outlet of the fuel cell stack 32 is also called a back pressure valve. This valve has a function of adjusting the pressure of the oxidizing gas inside the fuel cell stack 32 correspondingly to the opening degree of the valve. For example, a butterfly valve may be used as the valve in which the effective opening of a flow channel is adjusted.

The opening degree of the pressure-adjusting valve 36 may be electrically controlled by using a drive mechanism such as a small motor and a plunger. Thus, the feedback control of the opening degree of the pressure-adjusting valve 36 is performed so that the oxidizing gas pressure inside the fuel cell stack 32 is maintained at an operation directed pressure of the oxidizing gas corresponding to the operation command.

For example, the feedback control uses an opening degree map in which the opening degree of the pressure-adjusting valve 36 is associated with the oxidizing gas pressure inside the fuel cell stack 32. In the opening degree map, the opening degree of the pressure-adjusting valve 36, opening area of the pressure-adjusting valve 36, or the number of steps if a motor that drives the valve is a stepping motor are associated with the oxidizing gas pressure inside the fuel cell stack 32. The map is stored in an appropriate storage device and read out as necessary. A means in which the opening degree of the pressure-adjusting valve 36 is associated with the oxidizing gas pressure inside the fuel cell stack 32, for example in the form of a lookup table and computational formula, may be used instead of the map.

When the feedback control is so normally performed, the opening degree of the pressure-adjusting valve 36 is automatically changed so that the oxidizing gas pressure inside the fuel cell stack 32 is maintained at an operation directed pressure of the oxidizing gas corresponding to the operation command. The inlet of the pressure-adjusting valve 36 is a cathode outlet of the fuel cell stack 32, and the outlet of the pressure-adjusting valve 36 is the exhaust pipe 12 connected via the diluting unit 38. Therefore, if the pressure in the exhaust pipe 12 changes, the opening degree of the pressure-adjusting valve 36 changes accordingly.

For example, if water floods the exhaust pipe 12 and the exhaust surface area of the exhaust pipe 12 is decreased, the pressure inside the exhaust pipe 12 varies from the atmospheric pressure and the opening degree of the pressure-adjusting valve 36 changes accordingly. Thus, if the exhaust pipe 12 is flooded with water, a difference occurs between the opening degree of the pressure-adjusting valve 36 and the preset opening degree corresponding to the operation directed pressure. As will be described below, the control unit 50 determines whether the exhaust pipe 12 is flooded with water by using this difference.

The pressure sensor 40 provided between the cathode outlet of the fuel cell stack 32 and the pressure-adjusting valve 36 is a pressure detection device that detects the oxidizing gas pressure inside the fuel cell stack 32 that has been adjusted by the pressure-adjusting valve: The position of the pressure sensor may be in the cathode inlet of the fuel cell stack 32. In FIG. 2, the alternative position of the pressure sensor 42 is shown by a broken line.

The diluting unit 38 is a buffer container that collects the anode exhaust gas from the exhaust valve 34 at the anode side and the cathode exhaust gas that passed through the pressure-adjusting valve 36 and releases the gases to the outside with an appropriate hydrogen concentration. The outlet of the diluting unit 38 is connected to the inlet of the exhaust pipe 12.

The display unit 46 connected to the control unit 50 is a display device that outputs a warning signal that informs the driver that flooding has occurred in the exhaust pipe 12. A lamp, a display, or a buzzer may be used as the display unit 46. A warning lamp that shows an abnormal state of the vehicle is provided at the driver seat in the vehicle 10, and this warning lamp can be also used as the display 46.

As described above, the control unit 50 controls the constituent components of the fuel cell main unit 30 as the entire system and can be the so-called fuel cell central processing unit (CPU). The control unit 50 can be constituted by a computer suitable for installation on a vehicle.

The control unit 50 includes an operation control processing unit 52 that obtains an operation command 44 from an operation command unit (not shown in the figure) and controls the operation of the fuel cell stack 32 according to this command. The operation control processing includes a processing of performing feedback control of the opening degree of the pressure-adjusting valve 36 such that the oxidizing gas pressure inside the fuel cell stack 32 is maintained at the operation directed pressure directed to the fuel cell stack 32.

Further, the control unit 50 has a particular function of performing control such that inhibits the flooding of the exhaust pipe 12 from the outside. For this purpose, the control unit includes a flood estimation signal output processing unit 54 that outputs a flooding estimation signal indicating that the exhaust pipe 12 can be flooded when an opening degree difference that is a difference between the opening degree of the pressure-adjusting valve 36 and a preset opening degree corresponding to the operation directed pressure is equal to or greater than a preset threshold opening degree difference, a warning output display processing unit 56 that performs a processing of displaying at the display unit 46 a warning output that demands that the vehicle 10 be moved on the basis of the flooding estimation signal, a gas flow rate modification processing unit 58 that increases an oxidizing gas flow rate to a preset flooding-preventing flow rate when the oxidizing gas flow rate in the exhaust pipe 12 is equal to or lower than a preset threshold flow rate in a state in which the flooding estimation signal has been outputted, and an intermittent operation restriction processing unit 60 that performs a control that inhibits an intermittent operation of the fuel cell on the basis of the flooding estimation signal.

These functions can be realized with software. More specifically, these functions may be realized by executing a fuel cell vehicle operation control program. Some of these functions may be also realized with hardware.

FIG. 3 is a flowchart illustrating the processing performed to inhibit the flooding of the exhaust pipe, from among the various functions of the control unit 50. In this case, it is determined whether the feedback control of the pressure-adjusting valve 36 is possible (S10). The feedback control of the opening degree of the pressure-adjusting valve 36 is impossible, for example, where the feedback is prohibited when the opening-closing noise, of the valve caused by the feedback becomes a problem and when the pressure-adjusting valve fails.

If the determination in S10 is positive, it is determined whether the opening degree difference $\Delta\theta$, which is the difference between the opening degree of the pressure-adjusting valve 36 and the preset opening degree corresponding to the operation directed pressure, is equal to or greater than the preset threshold opening degree difference $\Delta\theta_0$ (S12). Further, if the determination in S10 is negative, it is determined whether the pressure difference $\Delta P$, which is the difference between the detected value of the pressure sensor 40 and the operation directed pressure, is equal to or greater than the preset threshold pressure difference $\Delta P_0$ (S14).

If the determination is positive in either of steps S12 and S14, it can be determined that the oxidizing gas pressure inside the fuel cell stack 32 is not maintained at the operation directed pressure that is directed to the fuel cell stack 32. In this case, it is assumed that the exhaust pipe 12 can be flooded, and, thus, a flooding estimation signal is outputted (S16). If the determination is negative in both steps S12 and S14, it can be determined that the oxidizing gas pressure inside the fuel cell stack 32 is maintained at the operation directed pressure that is directed to the fuel cell stack 32. Therefore, the flooding estimation warning signal is not outputted. The processes of steps S12, S14, and S16 are executed by the function of the flooding estimation signal output processing unit 54 of the control unit 50.

When the flooding estimation signal is outputted, the control unit 50 performs several correspondence processing operations correspondingly to other states of the vehicle 10, for example, the operation state of the vehicle 10 and operation state of the fuel cell system 20. One of such operations is that of displaying a warning output, which demands that the vehicle be moved, on the display unit 46 on the basis of the flooding estimation signal (S18). This process is executed by the function of the warning output display processing unit 56 of the control unit 50. When the driver sees the warning output display, the driver moves the vehicle, thereby imparting a certain speed to the vehicle. If the vehicle speed is higher than the flooding speed in the exhaust pipe, the exhaust pipe is prevented from flooding. In particular, in a case where the vehicle 10 is stopped in a water pool 8, the warning output display is effective.

As for the operation state of the fuel cell system 20 in a state in which the flooding estimation signal has been outputted, it is determined whether the oxidizing gas flow rate Q in the exhaust pipe 12 is equal to or lower than a preset threshold flow rate $Q_0$ (S20), and when the determination is positive, a processing of adding this flow rate to the preset flooding-preventing flow rate is performed (S22). These processes are executed by the function of the gas flow rate modification processing unit 58 of the control unit 50. When the oxidizing flow rate in the exhaust pipe 12 increases, water that is assumed to flood the exhaust pipe 12 is pushed back to the outside, thereby preventing the exhaust pipe 12 from flooding. The threshold flow rate $Q_0$ and the flooding-preventing flow rate may be set in advance based on the structure of the vehicle 10 and the like.

Further, the control of prohibiting the intermittent operation of the fuel cell system 20 may be also performed based on the flooding estimation signal (S24). This process is executed by the function of the intermittent operation control processing unit 60 of the control unit 50. When the fuel cell system 20 operates intermittently, the exhaust gas flow also becomes discontinuous. Therefore, flooding can easily occur. For example, a condition that the temperature of a coolant is abnormal is a condition for prohibiting the intermittent operation of the fuel cell. The probability of flooding can be reduced by adding the output of the flooding estimation signal to this prohibition condition.

Thus, it is monitored by the opening degree of the pressure-adjusting valve 36 or pressure sensor 40 as to whether a difference occurs between the oxidizing gas pressure inside the fuel cell stack 32 and the pressure based on the operation command, and the flooding estimation signal is outputted based on the monitoring result. As, a result, adequate processing can be performed correspondingly to, the operation state of the vehicle 10 and operation state of the fuel cell system 20. Therefore, the kick-up amount of the exhaust pipe 12 can be reduced and the flooding of the exhaust pipe 12 can be effectively inhibited, while ensuring the draining of water that is the reaction product.

The invention can be used in fuel cell vehicles provided with an exhaust pipe that releases the exhaust gas from a fuel cell system to the outside.

The invention claimed is:

1. A fuel cell vehicle comprising:
   a fuel cell stack that generates power by using an oxidizing gas and a fuel gas;
   an exhaust pipe that releases the oxidizing gas and the fuel gas from the fuel cell stack to outside;
   a pressure-adjusting valve that is provided between a cathode outlet of the fuel cell stack and the exhaust pipe and adjusts an oxidizing gas pressure inside the fuel cell stack correspondingly to adjustment of an opening degree;
   a pressure-adjusting valve opening degree control unit that performs feedback control of an opening degree of the pressure-adjusting valve so as to maintain the oxidizing gas pressure inside the fuel cell stack at an operation directed pressure that is directed to the fuel cell stack; and
   a flood estimation signal output unit that outputs a flooding estimation signal indicating that the exhaust pipe is flooded when an opening degree difference that is a difference between the opening degree of the pressure-adjusting valve and a preset opening degree corresponding to the operation directed pressure is equal to or greater than a preset threshold opening degree difference.

2. The fuel cell vehicle according to claim 1, further comprising:
   a display device that displays a warning output that demands that a vehicle be moved on the basis of the flooding estimation signal.

3. The fuel cell vehicle according to claim 1, further comprising:
   a flow rate modification unit that increases an oxidizing gas flow rate to a preset flooding-preventing flow rate when the oxidizing gas flow rate in the exhaust pipe is equal to or lower than a preset threshold flow rate in a state in which the flooding estimation signal has been outputted.

4. The fuel cell vehicle according to claim 1, further comprising:
   an intermittent operation restriction unit that performs a control that inhibits an intermittent operation of the fuel cell on the basis of the flooding estimation signal.

5. The fuel cell vehicle according to claim 1, further comprising:
   a pressure detection unit that detects an oxidizing gas pressure inside the fuel cell stack, wherein
   the flooding estimation signal output unit outputs the flooding estimation signal on the basis of a detected pressure of the pressure detection unit, if the feedback control of the opening degree of the pressure-adjusting valve is impossible.

6. The fuel cell vehicle according to claim 5, wherein the flooding estimation signal output device outputs a flooding estimation signal indicating that the exhaust pipe is flooded when a pressure difference, which is a difference between the detected pressure of the pressure detection unit and the operation directed pressure, is equal to or greater than a preset threshold pressure difference.

7. A control method for a fuel cell vehicle provided with: a fuel cell stack that generates power by using an oxidizing gas and a fuel gas; an exhaust pipe that releases the oxidizing gas and the fuel gas from the fuel cell stack to outside; and a pressure-adjusting valve that is provided between a cathode outlet of the fuel cell stack and the exhaust pipe and adjusts an oxidizing gas pressure inside the fuel cell stack correspondingly to adjustment of an opening degree, the method comprising:
   performing feedback control of an opening degree of the pressure-adjusting valve so as to maintain the oxidizing gas pressure inside the fuel cell stack at an operation directed pressure that is directed to the fuel cell stack; and
   outputting a flooding estimation signal indicating that the exhaust pipe is flooded when an opening degree difference that is a difference between the opening degree of the pressure-adjusting valve and a preset opening degree corresponding to the operation directed pressure is equal to or greater than a preset threshold opening degree difference.

8. The control method for a fuel cell vehicle according to claim 7, further comprising:
   displaying a warning output that demands that a vehicle be moved on the basis of the flooding estimation signal.

9. The control method for a fuel cell vehicle according to claim 7, further comprising:
   increasing an oxidizing gas flow rate to a preset flooding-preventing flow rate when the oxidizing gas flow rate in the exhaust pipe is equal to or lower than a preset threshold flow rate in a state in which the flooding estimation signal has been outputted.

10. The control method for a fuel cell vehicle according to claim 7, further comprising:
    performing control that inhibits intermittent operation of the fuel cell on the basis of the flooding estimation signal.

11. The control method for a fuel cell vehicle according to claim 7, further comprising:
    detecting an oxidizing gas pressure inside the fuel cell stack; and
    outputting the flooding estimation signal on the basis of a detected pressure, if the feedback control of the opening degree of the pressure-adjusting valve is impossible.

12. The control method for a fuel cell vehicle according to claim 11, wherein a flooding estimation signal indicating that the exhaust pipe is flooded is outputted when a pressure difference, which is a difference between the detected pressure and the operation directed pressure is equal to or greater than a preset threshold pressure difference.

* * * * *